(12) United States Patent
Murase et al.

(10) Patent No.: US 12,227,164 B2
(45) Date of Patent: Feb. 18, 2025

(54) ELECTRIFIED VEHICLE

(71) Applicants: TOYOTA JIDOSHA KABUSHIKI KAISHA, Toyota Aichi-ken (JP); SUBARU CORPORATION, Shibuya-ku Tokyo (JP)

(72) Inventors: Junichi Murase, Aichi-gun Aichi-ken (JP); Hideki Kubonoya, Toyota Aichi-ken (JP); Masamichi Iwama, Gotenba Shizuoka-ken (JP); Hiroshi Ienaga, Shibuya-ku Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 209 days.

(21) Appl. No.: 17/876,124

(22) Filed: Jul. 28, 2022

(65) Prior Publication Data

US 2023/0090814 A1 Mar. 23, 2023

(30) Foreign Application Priority Data

Sep. 21, 2021 (JP) ................. 2021-153414

(51) Int. Cl.
*B60W 10/08* (2006.01)
*B60L 15/20* (2006.01)
(52) U.S. Cl.
CPC ............ *B60W 10/08* (2013.01); *B60L 15/20* (2013.01); *B60L 2240/421* (2013.01); *B60W 2510/081* (2013.01)

(58) Field of Classification Search
CPC ...... B60W 10/06; B60W 10/08; B60W 20/00; B60W 2520/10; B60W 2540/10;
(Continued)

(56) References Cited

U.S. PATENT DOCUMENTS 4,924,396 A 5/1990 Fujioka et al.
2004/0008002 A1* 1/2004 Kamio ................. H02P 6/12
318/701
(Continued)

FOREIGN PATENT DOCUMENTS

JP 2620310 B2 6/1997
JP 2015-065733 A 4/2015
(Continued)

*Primary Examiner* — Angela Y Ortiz
*Assistant Examiner* — Aaron E Santos
(74) *Attorney, Agent, or Firm* — Dinsmore & Shohl LLP

(57) ABSTRACT

An electrified vehicle disclosed in the present specification includes: a motor configured to rotate a drive wheel of the electrified vehicle; a sensor configured to detect a motor rotation number that is the number of rotations of the motor; and a control device configured to perform feedback control of the motor rotation number based on a value detected by the sensor. The control device is configured to perform during the feedback control a process of extracting a vibration component in a predetermined frequency band from the value detected by the sensor, a process of calculating an integrated value by integrating the extracted vibration component for a predetermined period, and a process of determining whether the calculated integrated value falls within a predetermined abnormal range.

9 Claims, 8 Drawing Sheets

(58) Field of Classification Search
CPC ........... B60W 2710/083; B60W 20/10; B60W 30/20; B60W 50/14; B60W 20/40; B60W 20/15; B60W 2510/244; B60W 2510/0638; B60W 2520/105; B60W 10/18; B60W 10/20; B60W 10/02; B60W 2050/146; B60W 2710/0666; B60W 10/26; B60W 2520/28; B60W 50/082; B60W 2030/206; B60W 10/10; B60W 2420/403; B60W 30/02; B60W 40/08; B60W 50/0097; B60W 10/04; B60W 2540/12; B60W 2556/50; B60W 2710/18; B60W 2420/408; B60W 2540/18; B60W 30/12; B60W 10/184; B60W 2050/143; B60W 2555/20; B60W 2710/0644; B60W 10/30; B60W 2510/0676; B60W 2556/10; B60W 50/0098; B60W 30/09; B60W 10/115; B60W 2510/0657; B60W 2554/80; B60W 10/22; B60W 20/30; B60W 2554/00; B60W 2710/20; B60W 30/18127; B60W 40/09; B60W 50/16; B60W 2520/14; B60W 30/0956; B60W 40/105; B60W 60/0015; B60W 2050/0088; B60W 2510/081; B60W 2540/16; B60W 30/18163; B60W 30/182; B60W 40/06; B60W 20/17; B60W 2510/0685; B60W 2520/125; B60W 2556/45; B60W 2720/106; B60W 30/045; B60W 10/11; B60W 20/13; B60W 2510/068; B60W 2552/15; B60W 2710/0616; B60W 2050/0031; B60W 2510/083; B60W 2520/26; B60W 50/12; B60W 20/16; B60W 20/50; B60W 2050/0052; B60W 2540/221; B60W 2540/229; B60W 2552/00; B60W 30/19; B60W 50/06; B60W 50/085; B60W 2050/0075; B60W 2540/223; B60W 30/025; B60W 30/165; B60W 30/18172; B60W 30/188; B60W 50/087; B60W 50/10; B60W 2510/0241; B60W 2520/16; B60W 2554/804; B60W 30/0953; B60W 30/18; B60W 30/18109; B60W 20/11; B60W 2510/18; B60W 2554/402; B60W 2554/4046; B60W 2710/06; B60W 2710/105; B60W 2754/20; B60W 2754/30; B60W 30/08; B60W 30/18054; B60W 30/18154; B60W 60/001; B60W 60/0027; B60W 10/026; B60W 2040/0818; B60W 2050/0026; B60W 2510/1005; B60W 2530/10; B60W 2540/215; B60W 2710/0605; B60W 2710/1005; B60W 30/146; B60W 40/10; B60W 60/00272; B60W 60/00274; B60W 60/0053; B60W 20/20; B60W 2510/06; B60W 2530/12; B60W 2540/30; B60W 2552/40; B60W 2710/081; B60W 2720/30; B60W 30/1882; B60W 30/192; B60W 40/107; B60W 50/0205; B60W 20/12; B60W 2510/0275; B60W 2510/0604; B60W 2530/16; B60W 2530/20; B60W 2540/225; B60W 2552/30; B60W 2710/021; B60W 2710/08; B60W 2720/14; B60W 2720/16; B60W 40/068; B60W 60/0059; B60W 10/105; B60W 10/107; B60W 2050/021; B60W 2510/202; B60W 2510/246; B60W 2520/04; B60W 2540/22; B60W 2552/20; B60W 2552/35; B60W 2556/65; B60W 2710/0622; B60W 2710/0627; B60W 2710/086; B60W 2710/182; B60W 2720/10; B60W 30/16; B60W 30/18072; B60W 50/045; B60W 20/14; B60W 2050/0008; B60W 2050/0024; B60W 2510/0208; B60W 2510/107; B60W 2520/06; B60W 2520/18; B60W 2552/05; B60W 2554/4041; B60W 2554/801; B60W 2554/802; B60W 2555/60; B60W 2710/085; B60W 2720/28; B60W 2720/403; B60W 2756/10; B60W 30/10; B60W 30/143; B60W 2040/0827; B60W 2420/54; B60W 2510/0233; B60W 2510/0619; B60W 2510/0666; B60W 2510/082; B60W 2520/20; B60W 2520/30; B60W 2540/26; B60W 2555/00; B60W 2710/025; B60W 2710/065; B60W 2710/207; B60W 2710/22; B60W 2720/125; B60W 2720/406; B60W 2900/00; B60W 30/18009; B60W 30/18145; B60W 30/1819; B60W 30/194; B60W 40/02; B60W 40/04; B60W 40/072; B60W 40/13; B60W 50/029; B60W 50/08; B60W 10/101; B60W 10/188; B60W 10/24; B60W 20/19; B60W 2030/203; B60W 2040/0881; B60W 2040/1307; B60W 2050/0055; B60W 2050/0095; B60W 2050/0215; B60W 2510/0695; B60W 2530/209; B60W 2530/213; B60W 2540/00; B60W 2540/103; B60W 2540/227; B60W 2554/20; B60W 2554/4029; B60W 2556/55; B60W 2710/024; B60W 2710/244; B60W 30/06; B60W 30/085; B60W 30/162; B60W 30/181; B60W 30/1843; B60W 40/064; B60W 40/076; B60W 40/11; B60W 40/12; B60W 60/0013; B60W 60/0016; B60W 60/005; B60W 10/12; B60W 10/192; B60W 2050/0012; B60W 2050/0014; B60W 2050/0039; B60W 2050/0054; B60W 2050/0057; B60W 2300/14; B60W 2400/00; B60W 2510/0623; B60W 2510/0628; B60W 2510/0633; B60W 2510/0652; B60W 2510/0671; B60W 2510/102; B60W 2510/104; B60W 2510/105; B60W 2510/20; B60W 2510/22; B60W 2510/28; B60W 2510/30; B60W 2520/22; B60W 2520/263; B60W 2540/01; B60W 2540/06; B60W 2540/106; B60W 2540/14; B60W 2540/20; B60W 2556/00; B60W 2710/022; B60W 2710/0661; B60W 2710/0677; B60W 2710/0694; B60W 2710/12; B60W 2710/202; B60W 2710/226; B60W 2710/248; B60W 2710/30; B60W 2720/18; B60W 2720/26; B60W 2720/266; B60W 30/04; B60W 30/095; B60W 30/18118; B60W 30/184; B60W 30/1886; B60W 40/1005; B60W 40/101; B60W 40/109; B60W 50/00; B60W 50/02; B60W 50/0225; B60W 10/113; B60W 10/119; B60W 10/16;
B60W 10/182; B60W 10/28; B60W
2030/1809; B60W 2040/0872; B60W
2050/0022; B60W 2050/0042; B60W
2050/0056; B60W 2050/0063; B60W
2050/007; B60W 2050/0083; B60W
2050/046; B60W 2300/125; B60W
2300/185; B60W 2300/28; B60W
2420/40; B60W 2420/905; B60W
2510/025; B60W 2510/0291; B60W
2510/087; B60W 2510/10; B60W
2510/101; B60W 2510/1025; B60W
2510/1045; B60W 2510/1095; B60W
2510/227; B60W 2520/266; B60W
2530/211; B60W 2540/24; B60W
2552/10; B60W 2554/404; B60W
2554/406; B60W 2556/40; B60W
2710/027; B60W 2710/0683; B60W
2710/10; B60W 2710/1055; B60W
2710/28; B60W 2720/263; B60W 30/00;
B60W 30/14; B60W 30/18027; B60W
30/1884; B60W 40/00; B60W 50/04;
B60W 60/00; B60W 60/0051; B60W
60/0057; B60W 10/023; B60W 10/103;
B60W 10/14; B60W 2030/043; B60W
2030/082; B60W 2030/18081; B60W
2040/1392; B60W 2050/0004; B60W
2050/0005; B60W 2050/0006; B60W
2050/001; B60W 2050/0016; B60W
2050/0021; B60W 2050/0027; B60W
2050/0029; B60W 2050/0033; B60W
2050/0037; B60W 2050/0041; B60W
2050/005; B60W 2050/0051; B60W
2050/0059; B60W 2050/0062; B60W
2050/0064; B60W 2050/0091; B60W
2050/022; B60W 2300/145; B60W
2300/147; B60W 2300/18; B60W
2300/36; B60W 2300/367; B60W
2300/50; B60W 2420/22; B60W 2422/40;
B60W 2422/70; B60W 2422/80; B60W
2510/00; B60W 2510/02; B60W
2510/0225; B60W 2510/0258; B60W
2510/0609; B60W 2510/0614; B60W
2510/08; B60W 2510/084; B60W
2510/085; B60W 2510/088; B60W
2510/1015; B60W 2510/109; B60W
2510/12; B60W 2510/125; B60W
2510/188; B60W 2510/242; B60W
2510/305; B60W 2520/00; B60W
2520/403; B60W 2530/00; B60W
2530/13; B60W 2530/203; B60W
2540/041; B60W 2540/043; B60W
2540/049; B60W 2540/21; B60W
2552/25; B60W 2552/53; B60W
2554/4026; B60W 2554/4049; B60W
2554/805; B60W 2556/05; B60W
2710/02; B60W 2710/0638; B60W
2710/0672; B60W 2710/0688; B60W
2710/082; B60W 2710/1016; B60W
2710/186; B60W 2710/188; B60W
2710/205; B60W 2710/223; B60W
2710/305; B60W 2720/00; B60W
2720/103; B60W 2720/24; B60W
2720/40; B60W 2754/10; B60W 2754/50;
B60W 30/18063; B60W 30/1846; B60W 40/103; B60W 40/112; B60W 40/114;
B60W 60/00186; B60W 60/0021; B60W
60/0023; B60W 60/00253; B60W
60/00276; B60W 60/0055; B60W 60/007;
B60L 2240/423; B60L 50/16; B60L
2240/421; B60L 2240/12; B60L
2240/441; B60L 50/61; B60L 15/20;
B60L 2270/145; B60L 58/12; B60L
2210/40; B60L 15/2009; B60L 2240/445;
B60L 2240/486; B60L 2200/26; B60L
2250/26; B60L 2220/14; B60L 3/102;
B60L 2240/443; B60L 2260/28; B60L
7/14; B60L 2220/44; B60L 53/126; B60L
2240/465; B60L 3/0046; B60L 50/51;
B60L 53/12; B60L 7/18; B60L
2240/0461; B60L 15/2045; B60L
2210/30; B60L 2260/26; B60L 50/66;
B60L 1/003; B60L 15/007; B60L
2220/42; B60L 2240/36; B60L 2240/547;
B60L 2250/16; B60L 53/305; B60L
2240/545; B60L 2240/80; B60L 53/122;
B60L 53/14; B60L 58/13; B60L 15/2054;
B60L 2210/20; B60L 2240/525; B60L
2240/549; B60L 50/62; B60L 53/38;
B60L 3/0061; B60L 3/04; B60L 58/20;
B60L 7/26; B60L 8/003; B60L 2220/46;
B60L 2240/622; B60L 2250/10; B60L
3/108; B60L 53/20; B60L 58/21; B60L
15/2036; B60L 2210/10; B60L 2240/425;
B60L 3/0038; B60L 3/12; B60L 50/64;
B60L 53/11; B60L 53/36; B60L 53/65;
B60L 53/66; B60L 58/18; B60L 58/40;
B60L 15/025; B60L 2210/14; B60L
2220/18; B60L 2260/44; B60L 2270/34;
B60L 50/52; B60L 53/80; B60L 58/15;
B60L 2200/36; B60L 2240/14; B60L
2240/16; B60L 2250/24; B60L 3/10;
B60L 50/60; B60L 58/10; B60L 2220/16;
B60L 2240/22; B60L 2240/429; B60L
2240/485; B60L 2240/507; B60L
2240/62; B60L 2240/642; B60L 2240/70;
B60L 2250/28; B60L 2260/54; B60L
2270/142; B60L 2270/147; B60L 3/106;
B60L 53/32; B60L 58/19; B60L 7/12;
B60L 8/00; B60L 1/00; B60L 1/20; B60L
2200/12; B60L 2200/40; B60L 2240/24;
B60L 2250/12; B60L 2260/42; B60L
2260/46; B60L 2260/50; B60L 2270/12;
B60L 3/0023; B60L 3/003; B60L 3/0084;
B60L 5/005; B60L 50/15; B60L 50/40;
B60L 50/90; B60L 53/31; B60L 58/30;
B60L 58/33; B60L 7/10; B60L 1/02;
B60L 15/2018; B60L 2200/10; B60L
2200/32; B60L 2210/46; B60L 2240/18;
B60L 2240/20; B60L 2240/463; B60L
2240/526; B60L 2240/647; B60L
2240/662; B60L 2270/20; B60L 3/0053;
B60L 3/0069; B60L 3/0092; B60L 53/00;
B60L 53/124; B60L 53/22; B60L 53/302;
B60L 53/39; B60L 53/60; B60L 53/62;
B60L 53/68; B60L 58/34; B60L 7/006;
B60L 7/16; B60L 7/22; B60L 15/2063;
B60L 15/2072; B60L 15/2081; B60L
2200/24; B60L 2210/12; B60L 2220/12;
B60L 2220/52; B60L 2240/32; B60L 2240/34; B60L 2240/427; B60L 2240/44;
B60L 2240/645; B60L 2240/68; B60L
2240/72; B60L 2260/14; B60L 2260/52;
B60L 2270/42; B60L 3/0007; B60L
50/20; B60L 50/50; B60L 53/16; B60L
53/24; B60L 55/00; B60L 58/14; B60L
58/16; B60L 58/24; B60L 58/26; B60L
7/24; B60L 9/02; B60L 15/02; B60L
15/06; B60L 15/08; B60L 15/38; B60L
2200/16; B60L 2200/46; B60L 2220/20;
B60L 2220/50; B60L 2220/54; B60L
2240/26; B60L 2240/46; B60L 2240/527;
B60L 2240/529; B60L 2240/64; B60L
2240/66; B60L 2240/667; B60L 2250/20;
B60L 2250/22; B60L 2260/10; B60L
2260/12; B60L 2260/22; B60L 2260/24;
B60L 2260/30; B60L 2260/32; B60L
2260/56; B60L 3/00; B60L 3/0015; B60L
3/0076; B60L 3/06; B60L 3/104; B60L
50/11; B60L 50/13; B60L 50/72; B60L
53/37; B60L 53/51; B60L 53/63; B60L
53/64; B60L 53/665; B60L 58/31; B60L
7/003; B60L 7/28; B60L 8/006; B60L
9/12; B60L 9/22

See application file for complete search history.

(56) References Cited

U.S. PATENT DOCUMENTS

| | | | |
|---|---|---|---|
| 2004/0040758 A1* | 3/2004 | Shimizu | B60L 15/20 903/902 |
| 2009/0000857 A1* | 1/2009 | Sugiyama | B62D 5/0472 180/444 |
| 2009/0105921 A1* | 4/2009 | Hanatsuka | B60G 17/0165 701/80 |
| 2011/0010050 A1* | 1/2011 | Suzuki | B62D 5/0463 701/41 |
| 2012/0185132 A1* | 7/2012 | Kezobo | B62D 5/0472 701/41 |
| 2016/0221467 A1 | 8/2016 | Suzuki et al. | |
| 2017/0001660 A1* | 1/2017 | Chiba | B62D 5/0472 |
| 2018/0178657 A1 | 6/2018 | Moriya et al. | |
| 2020/0247244 A1 | 8/2020 | Yamane et al. | |

FOREIGN PATENT DOCUMENTS

| | | |
|---|---|---|
| JP | 2018-107874 A | 7/2018 |
| JP | 2020-127281 A | 8/2020 |
| JP | 2020-145863 A | 9/2020 |
| JP | 2021-027634 A | 2/2021 |

* cited by examiner

ELECTRIFIED VEHICLE

CROSS-REFERENCE TO RELATED APPLICATION

This application claims priority to Japanese Patent Application No. 2021-153414 filed on Sep. 21, 2021, incorporated herein by reference in its entirety.

BACKGROUND

1. Technical Field

The technique disclosed in the present specification relates to electrified vehicles.

2. Description of Related Art

Japanese Unexamined Patent Application Publication No. 2020-127281 (JP 2020-127281 A) discloses an electrified vehicle including a sensor for detecting the number of rotations of a drive motor and a control device capable of performing feedback control of the number of rotations of the motor based on the detected value from the sensor. The electrified vehicle determines that a drive wheel is slipping based on the number of rotations of the motor and the actual speed of the electrified vehicle (hereinafter referred to as "vehicle speed"). In this case, the electrified vehicle is configured to reduce the slip of the drive wheel by performing the feedback control of the number of rotations of the motor and adjusting the number of rotations of the drive wheel according to the vehicle speed.

SUMMARY

In the electrified vehicle of JP 2020-127281 A, the feedback control of the number of rotations of the motor is performed when the drive wheel is slipping. Regarding this feedback control, the inventors found an event that the vehicle speed fluctuates during the feedback control in some situations.

An electrified vehicle according to an aspect disclosed in the present specification includes: a motor configured to rotate a drive wheel of the electrified vehicle; a sensor configured to detect a motor rotation number that is the number of rotations of the motor; and a control device configured to perform feedback control of the motor rotation number based on a value detected by the sensor. The control device is configured to perform during the feedback control a process of extracting a vibration component in a predetermined frequency band from the value detected by the sensor, a process of calculating an integrated value by integrating the extracted vibration component for a predetermined period, and a process of determining whether the calculated integrated value falls within a predetermined abnormal range.

In the feedback control of the motor rotation number, the number of rotations of the motor is adjusted according to the value of the motor rotation number detected by the sensor. The detected value of the motor rotation number contains a vibration component having a specific frequency due to, for example, vibration caused in a drive system including the motor and the drive wheel and an external force applied from a road surface to the drive wheel. Such a vibration component serves as a disturbance in the feedback control of the motor rotation number, and thus may affect the motor rotation number (that is, vehicle speed). The vibration component contained in the detected value of the motor rotation number is small and has not been seen as a problem. However, as the required quality of vehicles increases, such a vibration component may not be able to be ignored under specific situations such as when the vehicle speed is relatively low and when the drive wheel is slipping.

Regarding the above points, the control device extracts the vibration component in the predetermined frequency band from the value detected by the sensor, and integrates the extracted vibration component for the predetermined period. Accordingly, even when the vibration component contained in the value detected by the sensor is small, the vibration component can be reliably detected. As a result, appropriate measures can be taken in a timely manner in order to reduce fluctuations in motor rotation number (that is, vehicle speed).

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
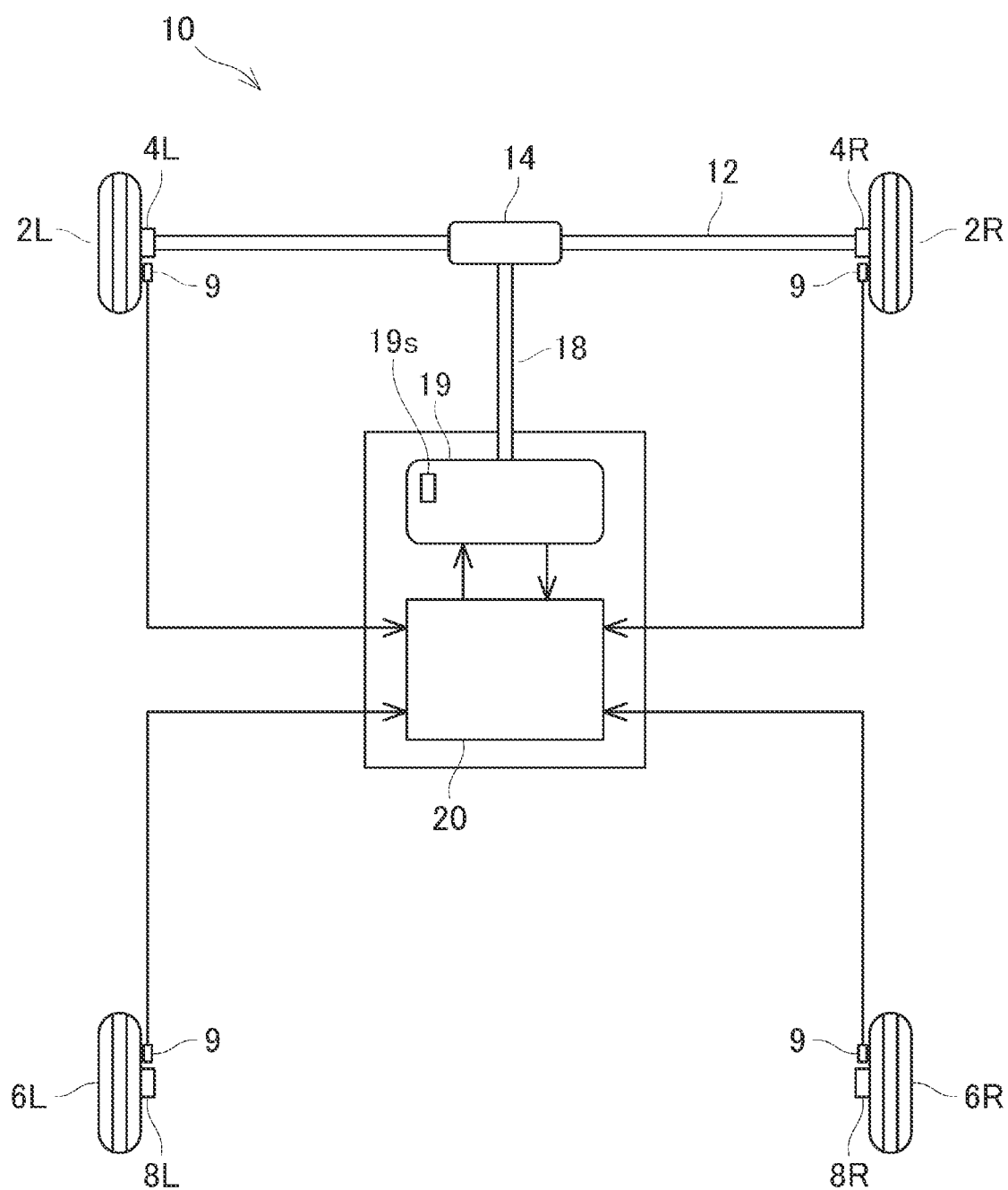
FIG. 1 is a block diagram of an electrified vehicle 10 of an embodiment.

In one embodiment of the technique of the present disclosure, the predetermined frequency band may include a resonance frequency of a drive system including the motor and the drive wheel. A vibration component due to the resonance frequency of the drive system can thus be more accurately detected.

In one embodiment of the technique of the present disclosure, the control device may be configured to reduce slip of the drive wheel by performing the feedback control when the slip of the drive wheel is detected.

When the feedback control of the motor rotation number is performed in order to reduce the slip of the drive wheel, the slip ratio of the drive wheel is kept in a relatively small range. In this regard, it was found that, on a part of road surfaces with a small coefficient of friction (that is, road surfaces on which wheel slip tends to occur), the coefficient of friction against the drive wheel changes according to the slip ratio of the drive wheel, and this change in coefficient of friction is significant in the range in which the slip ratio is relatively low. That is, when the feedback control of the motor rotation number is performed in order to reduce the slip of the drive wheel, an unstable behavior of the vehicle speed due to the above vibration component may further be amplified by the change in coefficient of friction. In this regard, in the above embodiment, when the feedback control of the motor rotation number is performed in order to reduce slip of the drive wheel, the vibration component contained in the motor rotation number can be reliably detected, so that necessary measures can be taken in a timely manner.

In one embodiment of the technique of the present disclosure, the control device may be configured to adjust the extracted vibration component with a predetermined gain when calculating the integrated value. According to such a configuration, for example, in a situation where a user of the electrified vehicle is less likely to feel vibration, setting the gain value to a value less than 1 can restrain the integrated value from falling within the abnormal range. For example, in a situation where the user of the electrified vehicle is more likely to feel vibration, setting the gain value to a value larger than 1 can help the integrated value fall within the abnormal range.

In one embodiment of the technique of the present disclosure, the control device may be configured to change the gain according to the vehicle speed of the electrified vehicle. The influence of vibration on the user varies according to the vehicle speed of the electrified vehicle. According to such a configuration, the control device changes the gain value according to the vehicle speed. The integrated value can therefore be adjusted according to the vehicle speed. As a result, whether the integrated value falls within the abnormal range can be adjusted according to the vehicle speed.

In one embodiment of the technique of the present disclosure, the control device may be configured to reduce the gain continuously or stepwise as the vehicle speed increases. As the vehicle speed increases, the user is less likely to perceive vibration. On the other hand, when the vehicle speed is low, the user is more likely to perceive vibration. According to the above configuration, the gain value is reduced continuously or stepwise as the vehicle speed increases. This can restrain the integrated value from falling within the abnormal range in a situation where the user is less likely to perceive vibration.

In one embodiment of the technique of the present disclosure, the control device may be configured to set the gain to zero when the vehicle speed is higher than a predetermined threshold speed. This configuration can prevent the integrated value from falling within the abnormal range in a situation where the vehicle speed is higher than the predetermined threshold speed and the user is less likely to perceive vibration.

In one embodiment of the technique of the present disclosure, the drive wheel may include a left drive wheel and a right drive wheel. In this case, the control device may be configured to change a gain according to a difference between the number of rotations of the left drive wheel and the number of rotations of the right drive wheel. When the difference between the number of rotations of the left drive wheel and the number of rotations of the right drive wheel of the electrified vehicle is large, the user is less likely to perceive vibration. On the other hand, when this difference is small, the user is more likely to perceive vibration. The influence of vibration on the user varies according to this difference. According to the above configuration, the integrated value can be adjusted according to this difference. As a result, whether the integrated value falls within the abnormal range can be adjusted according to this difference.

In one embodiment of the technique of the present disclosure, the control device may be configured to set the gain to zero when the difference is higher than a predetermined threshold value. This configuration can prevent the integrated value from falling within the abnormal range in a situation where the user is less likely to perceive vibration.

In one embodiment of the technique of the present disclosure, the control device may be configured to increase a desired value of the motor rotation number in the feedback control when the integrated value falls within the abnormal range. When the desired value is low, the motor rotation number decreases. The wheel speed therefore decreases. As a result, the influence of the vibration component increases. According to the above configuration, when vibration occurs, the desired value of the motor rotation number is increased to prevent the vehicle speed from decreasing. This reduces an increase in influence of the vibration component.

In one embodiment of the technique of the present disclosure, the control device may be configured to change a feedback gain in the feedback control when the integrated value falls within the abnormal range. This configuration can reduce a change in motor rotation number due to the feedback control. The occurrence of vibration can thus be reduced.

In one embodiment of the technique of the present disclosure, the control device may be configured to set a feedback gain in the feedback control to zero when the integrated value falls within the abnormal range. This configuration can prevent a change in motor rotation number due to the feedback control. The occurrence of vibration can thus be reduced.

In one embodiment of the technique of the present disclosure, the control device may be configured to stop the feedback control when the integrated value falls within the abnormal range. This configuration can prevent a change in motor rotation number due to the feedback control when vibration is occurring. The occurrence of vibration can thus be reduced.

Embodiment

An electrified vehicle according to an embodiment will be described with reference to the drawings. As shown in FIG. 1, an electrified vehicle 10 of the embodiment includes four wheels (left drive wheel 2L, right drive wheel 2R, left driven wheel 6L, and right driven wheel 6R). The electrified vehicle 10 further includes a drive shaft 12, a differential gear 14, a propeller shaft 18, a motor 19, and a control device 20.

The left drive wheel 2L and the right drive wheel 2R are located in the front part of the electrified vehicle 10 (that is, in the upper part in FIG. 1), and the left driven wheel 6L and the right driven wheel 6R are located in the rear part of the electrified vehicle 10 (that is, in the lower part in FIG. 1). The left drive wheel 2L is fixed to the left end of the drive shaft 12 via a hub 4L, and the right drive wheel 2R is fixed to the right end of the drive shaft 12 via a hub 4R. The drive shaft 12 is connected to the motor 19 via the differential gear 14 and the propeller shaft 18. The motor 19 functions as an electric motor and a generator. When functioning as an electric motor, the motor 19 applies torque to the propeller shaft 18. The torque is transmitted to the drive wheels 2R, 2L via the differential gear 14 and the drive shaft 12. As a result, the drive wheels 2R, 2L rotate and the electrified vehicle 10 moves.

The left driven wheel 6L is fixed to the left rear part of the electrified vehicle 10 via a hub 8L, and the right driven wheel 6R is fixed to the right rear part of the electrified vehicle 10 via a hub 8R. As shown in FIG. 1, the driven wheels 6R, 6L are not connected to the motor 19. That is, the torque of the motor 19 is not transmitted to the driven wheels 6R, 6L. The electrified vehicle 10 is a so-called front-wheel drive vehicle.

Each hub 4R, 4L, 8R, 8L rotates with a corresponding one of the drive wheels 2R, 2L, and driven wheels 6R, 6L. Wheel speed sensors 9 are mounted near the hubs 4R, 4L, 8R, and 8L. Each wheel speed sensor 9 detects the rotational speed of a corresponding one of the hubs 4R, 4L, 8R, and 8L.

The control device 20 is a computer that controls various functions of the electrified vehicle 10. Although not shown in the figure, the control device 20 includes an electronic circuit including a central processing unit (CPU), a random access memory (RAM), and a read-only memory (ROM). The control device 20 receives the rotational speeds of the hubs 4R, 4L, 8R, and 8L (that is, the drive wheels 2R, 2L, and the driven wheels 6R, and 6L) from the wheel speed sensors 9. The control device 20 estimates the vehicle speed of the electrified vehicle 10 by calculating the average value of the rotational speeds of the driven wheels 6R, 6L.

The control device 20 calculates command torque based on the operation of an accelerator (not shown) of the electrified vehicle 10. The control device 20 inputs the electric power for outputting the calculated command torque to the motor 19 to the motor 19. As a result, the motor 19 applies the command torque to the propeller shaft 18. The control device 20 thus controls the torque of the motor 19 (that is, motor rotation number) based on the command torque. Hereinafter, this control method will be referred to as "torque control."

The motor 19 includes a motor sensor 19s that detects the number of rotations of the motor 19. As described in detail later, the motor 19 sends the number of rotations of the motor 19 detected by the motor sensor 19s to the control device 20. As a result, the control device 20 feeds back the number of rotations of the motor 19 and controls the motor 19. That is, the control device 20 can perform "feedback control" of the number of rotations of the motor 19 in addition to the torque control.

Figure 2:
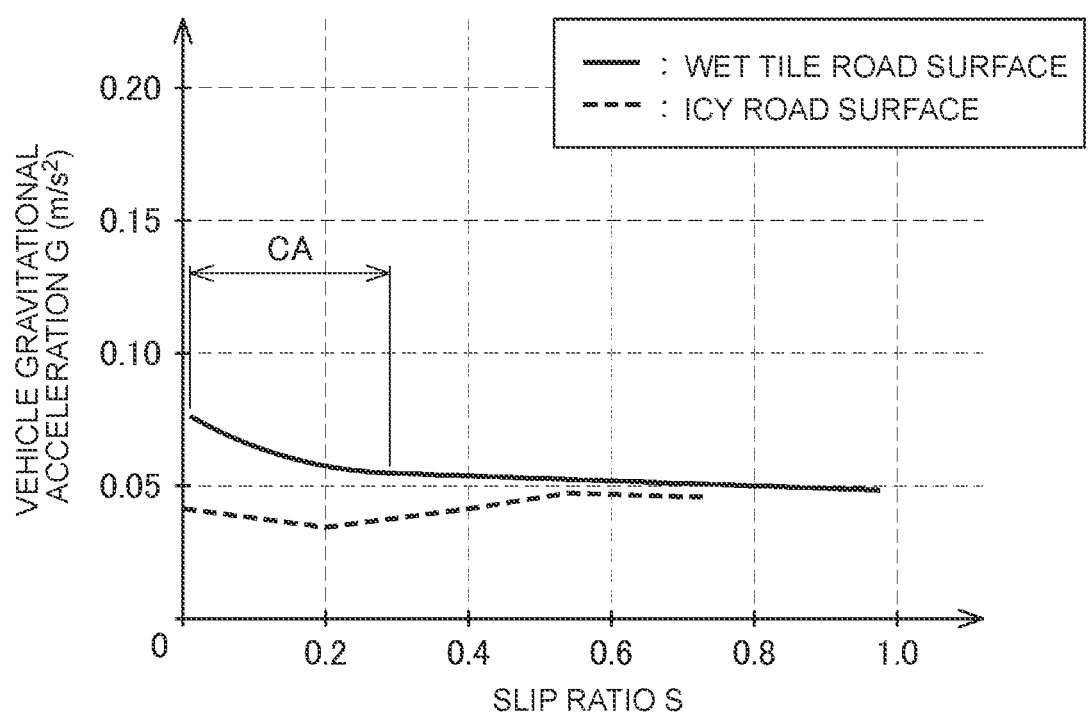
FIG. 2 is a graph showing the relationship between the slip ratio S and the vehicle gravitational acceleration G.

The relationship between the slip ratio S and the gravitational acceleration in the longitudinal direction acting on the electrified vehicle 10 (hereinafter referred to as vehicle gravitational acceleration G) will be described with reference to FIG. 2. In FIG. 2, the abscissa represents the slip ratio, and the ordinate represents the vehicle gravitational acceleration G. The slip ratio S is a value indicating instability of the driving behavior of the electrified vehicle 10. More specifically, the slip ratio S is a value indicating how much difference there is between the average value of the rotational speeds of the drive wheels 2R, 2L (see FIG. 1) and the vehicle speed of the electrified vehicle 10. When each drive wheel 2R, 2L slips (that is, when the slip ratio S increases), the rotational speed of each drive wheel 2R, 2L increases with respect to the vehicle speed. That is, the slip ratio S is proportional to the difference between the average value of the rotational speeds of the drive wheels 2R, 2L and the vehicle speed. The slip ratio is inversely proportional to the vehicle speed. The slip ratio S is therefore calculated by, for example, the following expression (1).

$$S = (\text{average value of rotational speeds of drive wheels } 2R, 2L - \text{vehicle speed})/\text{vehicle speed} \quad (1)$$

Therefore, when the average value of the rotational speeds of the drive wheels 2R, 2L minus the vehicle speed is the same, the lower the vehicle speed, the higher the slip ratio S. The inventors examined the relationship between the slip ratio S and the vehicle gravitational acceleration G in various road surface conditions. As a result, as shown by a dashed line in the graph of FIG. 2, the value of the vehicle gravitational acceleration G is kept substantially constant on an icy road surface, namely a frozen road surface, even when the slip ratio S changes. However, it was found that, in a situation where water is retained on a road surface, such as on a wet tile road surface, the vehicle gravitational acceleration G increases sharply when the slip ratio decreases, as shown in an inflection range CA of a continuous line in the graph of FIG. 2.

Therefore, the vehicle gravitational acceleration G changes significantly when the slip ratio changes within the inflection range CA particularly on a wet tile road surface. In other words, vibration occurs in the electrified vehicle 10 when the slip ratio changes within the inflection range CA on a wet tile road surface.

Slip Detection Process

Figure 3:
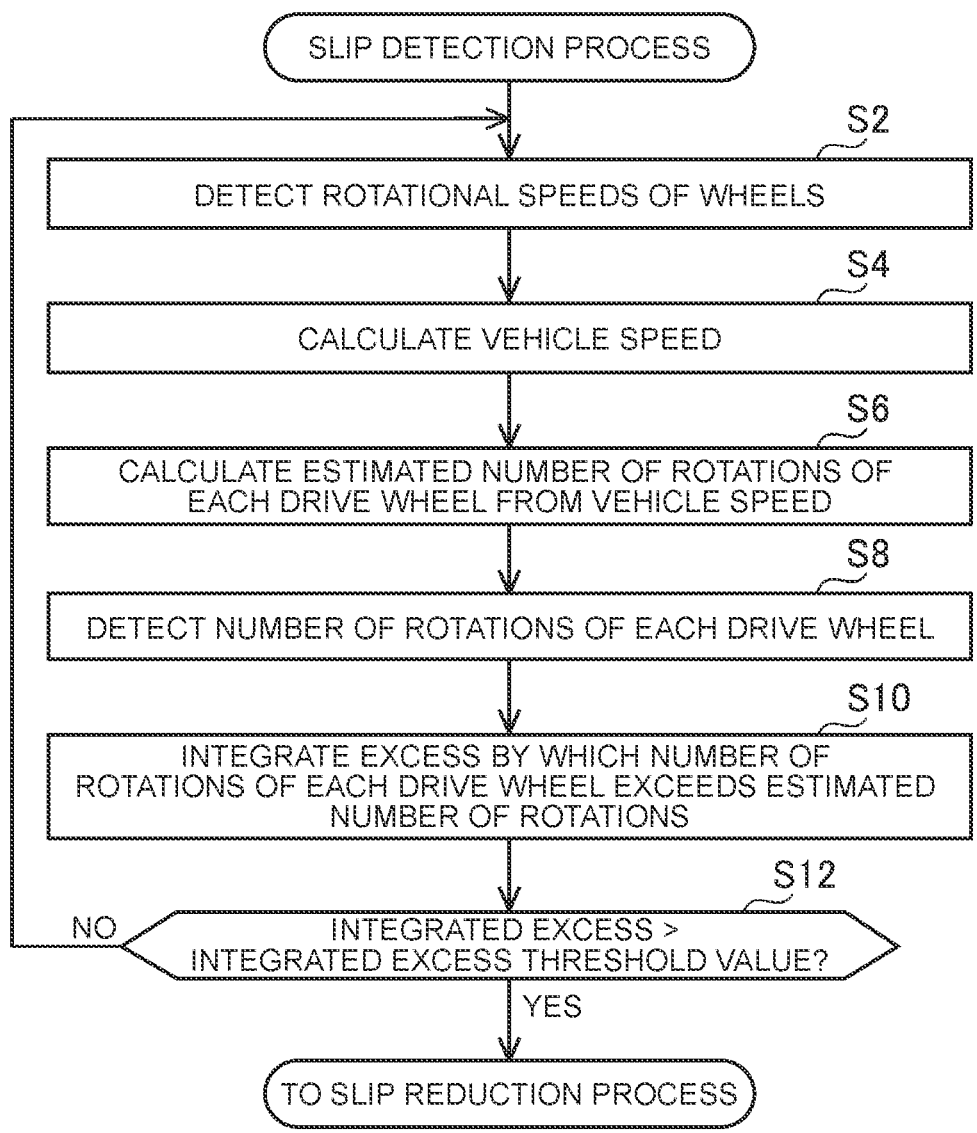
FIG. 3 is a flowchart of a slip detection process that is performed by a control device 20.

A slip detection process that is performed by the control device 20 will be described with reference to FIG. 3. While the electrified vehicle 10 is moving, the control device 20 performs the slip detection process shown in FIG. 3 while controlling the torque of the motor 19 by the torque control described above. The slip detection process is a process of detecting slip of each drive wheel 2R, 2L of the electrified vehicle 10.

In S2, the control device 20 receives the rotational speeds of the driven wheels 6R, 6L from the wheel speed sensors 9 corresponding to the driven wheels 6R, 6L. In S4, the control device 20 then calculates the vehicle speed of the electrified vehicle 10 from the average value of the received rotational speeds of the driven wheels 6R, 6L. In S6, the control device 20 calculates an estimated number of rotations of each drive wheel 2R, 2L from the calculated vehicle speed. The estimated number of rotations refers to the number of rotations of each drive wheel 2R, 2L required for the electrified vehicle 10 to move at the calculated vehicle speed with the drive wheels 2R, 2L not slipping.

In S8, the control device 20 receives the actual rotational speeds of the drive wheels 2R, 2L from the wheel speed sensors 9 corresponding to the drive wheels 2R, 2L and detects the number of rotations of each drive wheel 2R, 2L from the rotational speeds. In S10, the control device 20 compares the received actual number of rotations of each drive wheel 2R, 2L with the estimated number of rotations of each drive wheel 2R, 2L to calculate an excess by which the received actual number of rotations of each drive wheel 2R, 2L exceeds the estimated number of rotations. The control device 20 integrates the excess.

In S12, the control device 20 compares the integrated excess with an integrated excess threshold value. The integrated excess threshold value is a value preset in the control device 20, and is a threshold value for determining whether each drive wheel 2R, 2L is slipping. When the integrated excess is larger than the integrated excess threshold value (YES in S12), the control device 20 determines that each drive wheel 2R, 2L is slipping. The control device 20 then stops the torque control and executes a slip reduction process. On the other hand, when the integrated excess is not larger than the integrated excess threshold value (NO in S12), the control device 20 determines that each drive wheel 2R, 2L is not slipping. The control device 20 thus continues the torque control and performs S2 again. As described above, the control device 20 detects whether each drive wheel 2R, 2L is slipping while the electrified vehicle 10 is moving.

Slip Reduction Process

Figure 4:
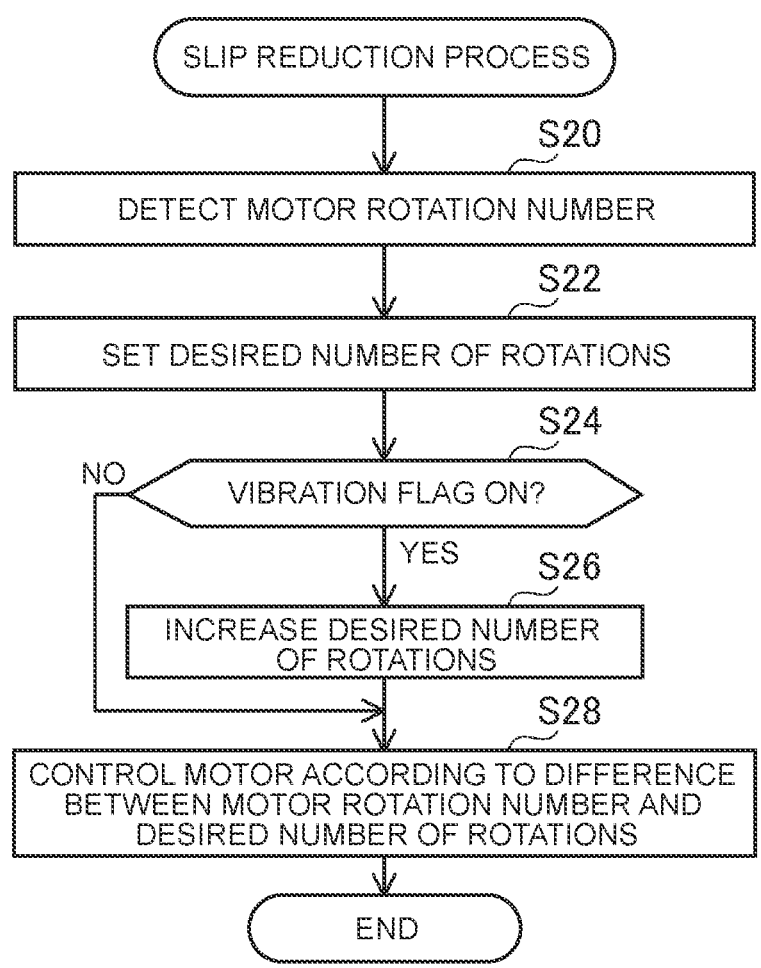
FIG. 4 is a flowchart of a slip reduction process that is performed by the control device 20.

The slip reduction process that is performed by the control device 20 will be described with reference to FIG. 4. The slip reduction control is feedback control of the motor rotation number that is performed to reduce slip of each drive wheel 2R, 2L when the slip of each drive wheel 2R, 2L is detected. In S20, the control device 20 receives the motor rotation number that is the number of rotations of the motor 19 from the motor sensor 19s. In S22, the control device 20 then sets a desired number of rotations that is a desired value of the number of rotations of the motor 19. The desired number of rotations is obtained by, for example, multiplying the above estimated number of rotations by a factor for adjusting the number of rotations of each drive wheel 2R, 2L to the number of rotations of the motor 19, such as a predetermined slip ratio.

In S24, the control device 20 determines whether a vibration flag is on. As will be described later with reference to FIG. 5, the vibration flag indicates that the motor 19 is vibrating in a predetermined frequency band. When the vibration flag is not on (NO in S24), the routine skips S26 and proceeds to S28.

In S28, the control device 20 controls the motor 19 according to the difference between the motor rotation number detected in S20 and the desired number of rotations.

When the vibration flag is on (YES in S24), the control device 20 increases the desired number of rotations set in S22. In this case, in S28, the control device 20 controls the motor 19 according to the difference between the motor rotation number detected in S20 and the increased desired number of rotations. As shown in the inflection range CA in FIG. 2, the vehicle gravitational acceleration G increases sharply in the section where the slip ratio S is low (0 to about 0.3). Increasing the desired number of rotations increases the difference between the average value of the rotational speeds of the drive wheels 2R, 2L and the vehicle speed. As a result, the slip ratio S increases. This can reduces the possibility that the slip ratio S may fall within the inflection range CA, and can thus reduce the occurrence of vibration. As described above, the control device 20 of the present embodiment performs the feedback control of the motor rotation number when slip of each drive wheel 2R, 2L is detected.

Vibration Detection Process

Figure 5:
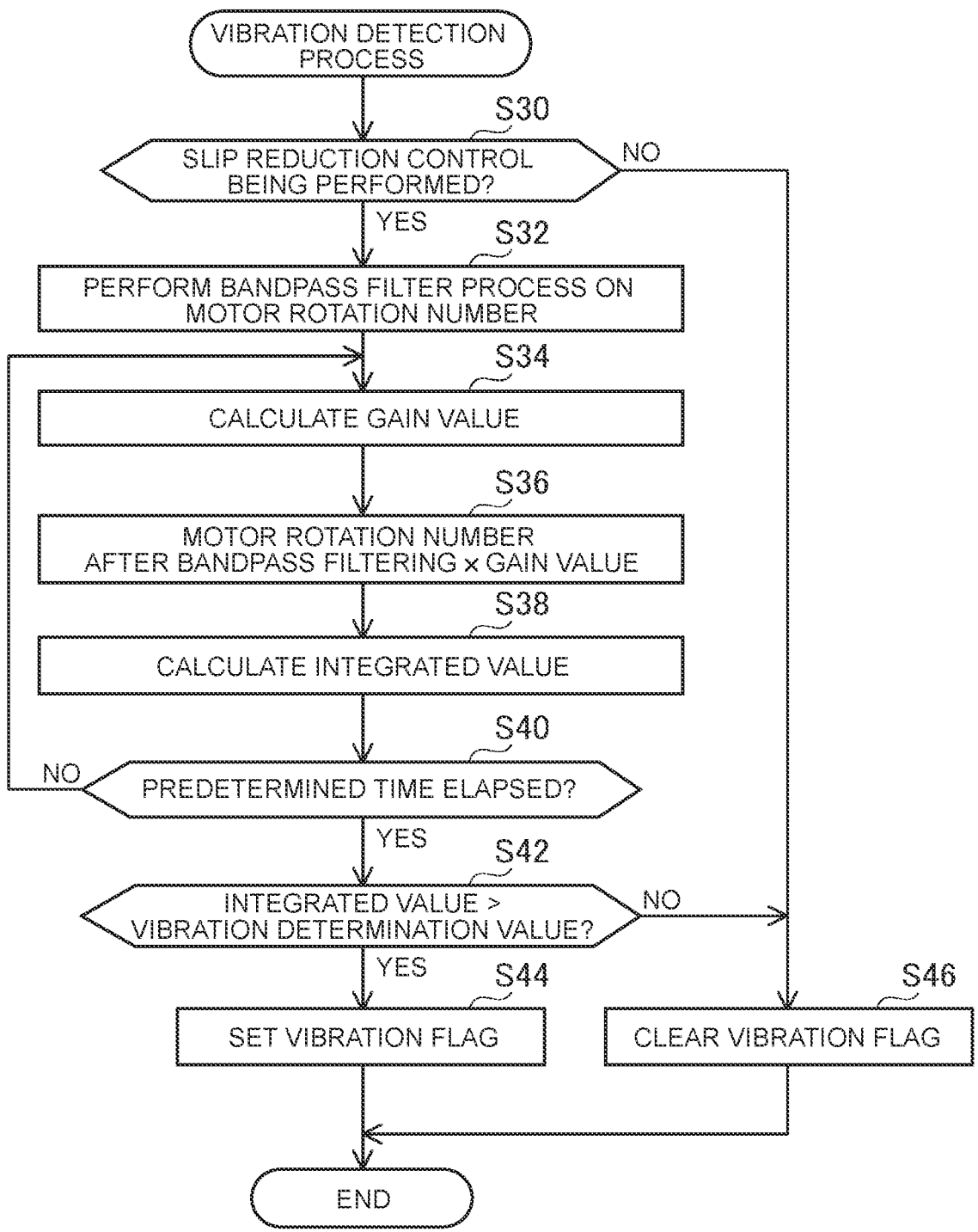
FIG. 5 is a flowchart of a vibration detection process that is performed by the control device 20.

A vibration detection process that is performed by the control device 20 will be described with reference to FIG. 5. The control device 20 performs the vibration detection process while the electrified vehicle 10 is moving. The vibration detection process is a process of detecting vibration that occurs especially around the motor 19 when slip of each drive wheel 2R, 2L is detected.

In S30, the control device 20 determines whether the slip reduction process (see FIG. 4) is currently being performed. When the slip reduction process is currently not being performed (NO in S30), the control device 20 clears the vibration flag in S46 and ends the vibration detection process.

When the slip reduction process is currently being performed (YES in S30), the control device 20 performs a bandpass filter process on the motor rotation number detected in S20 (see FIG. 4) in S32. The bandpass filter process is a process of converting the frequency of the motor rotation number to a predetermined frequency band. In the present embodiment, the predetermined frequency band includes the resonance frequency of the drive system including the motor 19, the drive shaft 12, and the drive wheels 2R, 2L, and includes, for example, 12 Hz. By converting the frequency of the motor rotation number to the frequency band including the resonance frequency of the drive system, a vibration component that is highly likely to cause resonance of the drive system out of vibration components contained in the motor rotation number can be extracted. In a modification, the predetermined frequency band may be the resonance frequency of the entire electrified vehicle 10 or the resonance frequency of the motor 19 alone.

In S34, the control device 20 then acquires predetermined information from various parts of the electrified vehicle 10 and calculates a gain value using the acquired information. The gain value is a value for adjusting the vibration component processed in S32.

Gain Value

Figure 6:
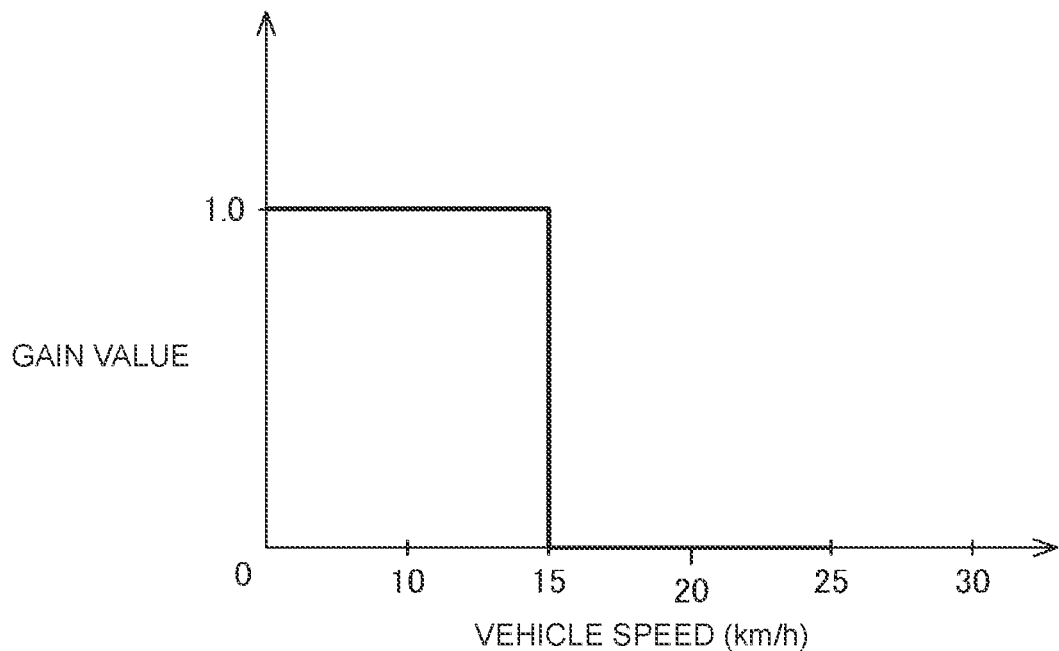
FIG. 6 is a graph showing the relationship between the vehicle speed and the gain value.
Figure 7:
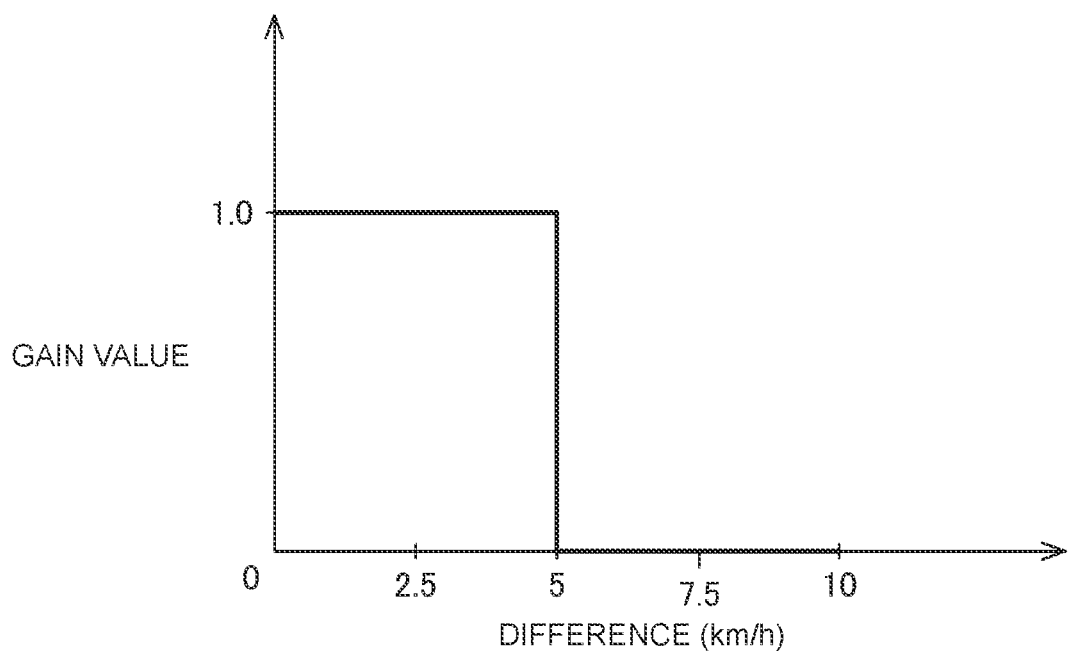
FIG. 7 is a graph showing the relationship between the difference between the number of rotations of a left drive wheel and the number of rotations of a right drive wheel and the gain value.

The gain value of the present embodiment will be described with reference to FIGS. 6 and 7. The control device 20 of the present embodiment calculates the gain value using the vehicle speed and the difference between the rotational speeds of the drive wheels 2R, 2L. As shown in FIG. 6, the control device 20 sets the gain value to 1.0 when the vehicle speed calculated in S4 (see FIG. 3) is 15 km/h or less. The control device 20 sets the gain value to zero when the vehicle speed is higher than 15 km/h.

The influence of vibration on a user varies according to the vehicle speed of the electrified vehicle 10. Specifically, when the vehicle speed is higher than 15 km/h, the user is less likely to perceive vibration, if at all. On the other hand, when the vehicle speed is 15 km/h or less, the user is more likely to perceive vibration, if any. The control device 20 of the present embodiment sets the gain value to zero when the vehicle speed is higher than 15 km/h. This configuration can prevent unnecessary detection of vibration in the situation where the use is less likely to perceive vibration.

The control device 20 calculates the difference between the rotational speeds of the drive wheels 2R, 2L received from the wheel speed sensors 9 corresponding to the drive wheels 2R, 2L. As shown in FIG. 7, the control device 20 sets the gain value to 1.0 when the difference between the rotational speeds of the drive wheels 2R, 2L is 5 km/h or less. The control device 20 sets the gain value to zero when the difference is larger than 5 km/h.

The influence of vibration on the user varies according to the difference between the rotational speeds of the drive wheels 2R, 2L. Specifically, when the difference between the rotational speeds of the drive wheels 2R, 2L is larger than 5 km/h, the user is less likely to perceive vibration, if at all. On the other hand, when the difference between the rotational speeds of the drive wheels 2R, 2L is 5 km/h or less, the user is more likely to perceive vibration, if any. The control device 20 of the present embodiment sets the gain value to zero when the difference between the rotational speeds of the drive wheels 2R, 2L is larger than 5 km/h. This configuration can prevent unnecessary detection of vibration in the situation where the use is less likely to perceive vibration.

Referring back to FIG. 5, the vibration detection process will further be described. In S36, the control device 20 adjusts the vibration component by multiplying the vibration component processed in S32 and the gain value described with reference to FIGS. 6 and 7. In S38, the control device 20 then calculates an integrated value of the vibration component adjusted in S36.

In S40, the control device 20 determines whether a predetermined period has elapsed. The predetermined period is a period during which it can be determined that the vibration of the drive system described above is continuously occurring. The predetermined period is, for example, 1000 msec. When the predetermined period has not elapsed (NO in S40), the routine returns to S34, and the control device 20 calculates the gain value again. That is, the control device 20 repeats S34 to S38 until the predetermined period elapses.

When the predetermined period has elapsed (YES in S40), the control device 20 compares the integrated value for the predetermined period with a vibration determination value in S42. The vibration determination value is a threshold value for determining that the vibration of the drive system is occurring, and is stored in advance in the control device 20. When the integrated value is larger than the vibration determination value (YES in S42), the control device 20 determines that the vibration of the drive system is occurring, and the routine proceeds to S44. The control device 20 sets the vibration flag in S44, and ends the vibration detection process. On the other hand, when the integrated value is equal to or less than the vibration determination value (NO in S42), the control device 20 determines that the vibration of the drive system is not occurring, and the routine proceeds to S46. The control device 20 clears the vibration flag in S46, and ends the vibration detection process.

Effects of Embodiment

As described above, the control device 20 detects the motor rotation number and adjusts the number of rotations of the motor 19 in the slip reduction process. The detected motor rotation number contains a vibration component having a specific frequency due to, for example, vibration of the drive system such as the motor 19 and the drive wheels 2R, 2L and an external force applied from the road surface to the drive wheels 2R, 2L. This vibration component serves as a disturbance in the feedback control of the motor rotation number that is performed in the slip reduction process and, for example, changes the vehicle gravitational acceleration G as described with reference to FIG. 3. The control device 20 of the electrified vehicle 10 of the present embodiment extracts the vibration component in the predetermined frequency band (S32) from the motor rotation number detected in the slip reduction process. The control device 20 integrates the extracted vibration component for the predetermined period (S38), compares the integrated value with the vibration determination value, and detects the occurrence of vibration. The occurrence of vibration can thus be detected from the slight vibration component contained in the motor rotation number.

Second Embodiment

Figure 8:
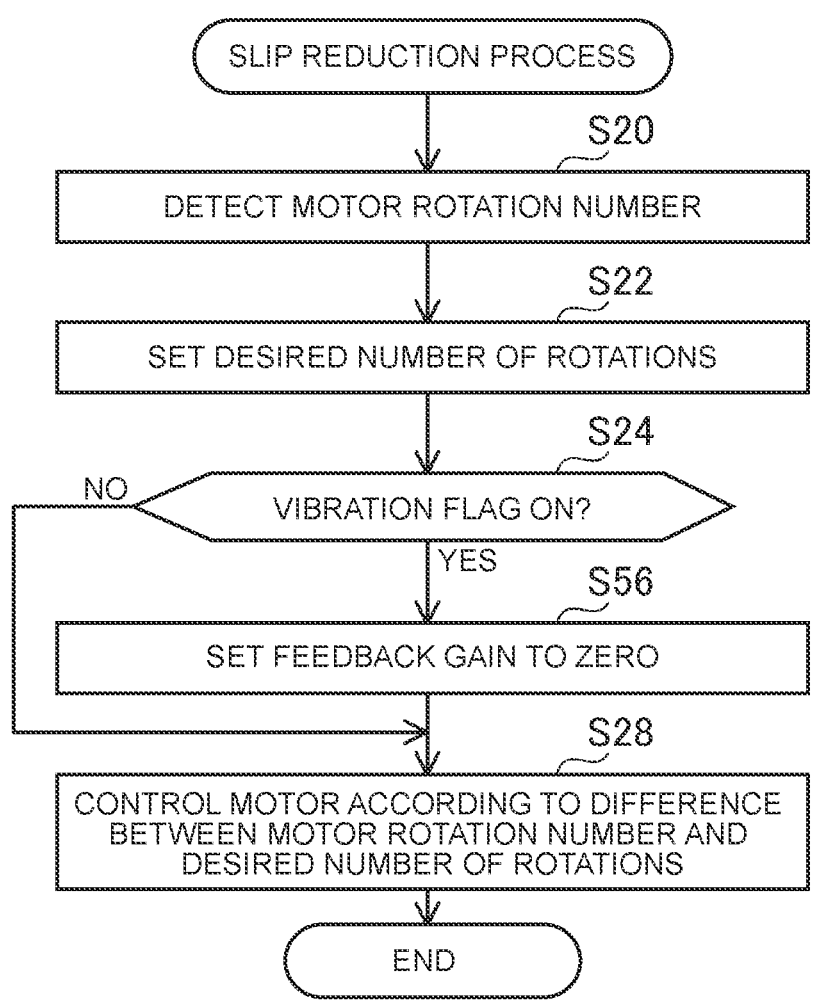
FIG. 8 is a flowchart of a slip reduction process that is performed by the control device 20 of a second embodiment.

A slip reduction process that is performed by the control device 20 of the electrified vehicle 10 of a second embodiment will be described with reference to FIG. 8. In the slip reduction process, when the vibration flag is on (YES in S24), the control device 20 of the second embodiment sets a feedback gain to zero in S56 instead of performing S26. The configuration of the electrified vehicle 10 of the second embodiment is otherwise similar to that of the electrified vehicle 10 of the first embodiment.

The feedback control of the motor rotation number is thus substantially stopped. As a result, the number of rotations of the motor 19 will not be changed by the feedback control. The occurrence of vibration can thus be reduced. In a modification, the control device 20 may set the feedback gain to a value larger than 1 in S56. This enhances the feedback control of the motor rotation number, so that the vibration can be reduced.

Third Embodiment

Figure 9:
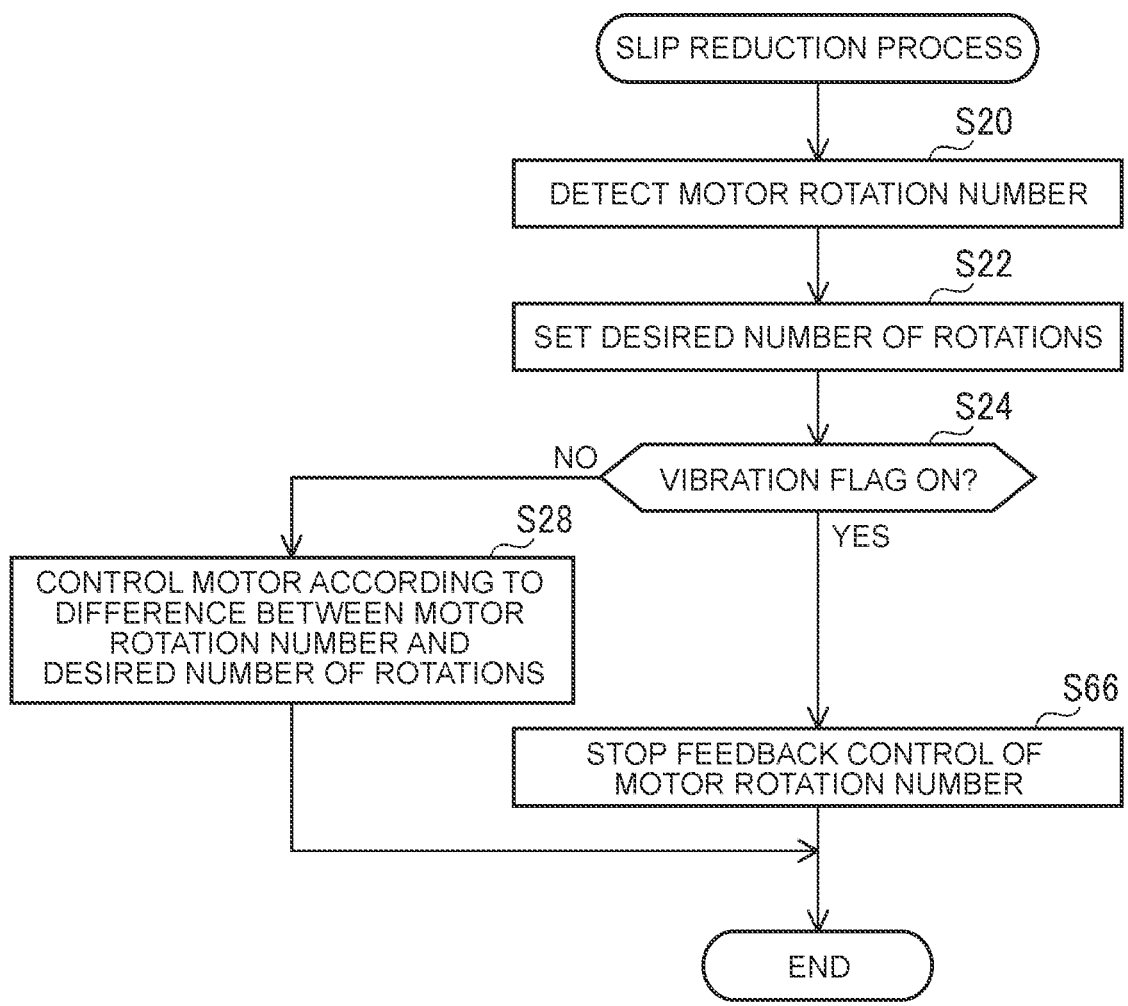
FIG. 9 is a flowchart of a slip reduction process that is performed by the control device 20 of a third embodiment.

A slip reduction process that is performed by the control device 20 of the electrified vehicle 10 of a third embodiment will be described with reference to FIG. 9. In the slip reduction process, when the vibration flag is on (YES in S24), the control device 20 of the third embodiment stops the feedback control of the motor rotation number in S66 instead of performing S26. The configuration of the electrified vehicle 10 of the third embodiment is otherwise similar to that of the electrified vehicle 10 of the first embodiment. As a result, the number of rotations of the motor 19 will not be changed by the feedback control. The occurrence of vibration can thus be reduced.

Although the specific examples of the technique disclosed herein are described in detail above, these examples are merely illustrative and are not intended to limit the scope of claims. The technique described in the claims includes various modifications and changes of the specific examples illustrated above. Modifications of the above embodiments will be described.

First Modification

In the vibration detection process, the control device 20 may not multiply the motor rotation number after the bandpass filtering by the gain value. That is, S34 and S36 in FIG. 5 may be omitted in this modification. In another modification, a vehicle-specific gain value may be used instead of the vehicle speed and the difference between the rotational speeds of the drive wheels 2R, 2L. In this case, for example, the vehicle-specific gain value may be set to a low value when the electrified vehicle 10 has a structure that is less susceptible to vibration, or the vehicle-specific gain value may be set to a high value when the electrified vehicle 10 has a structure that is susceptible to vibration.

Second Modification

For example, in the vibration detection process, the control device 20 may set the gain value to 0.5 when the vehicle speed is higher than 10 km/h, and may set the gain value to zero when the vehicle speed is higher than 15 km/h. That is, the control device 20 may reduce the gain value stepwise. In another modification, the control device 20 may continuously reduce the gain value as the vehicle speed increases.

The technical elements illustrated in the present specification or the drawings have technical utility alone or in various combinations, and are not limited to the combinations described in the claims as originally filed. The technique illustrated in the present specification or the drawings may achieve a plurality of objects at the same time, and has technical utility by achieving one of the objects.

What is claimed is:
1. An electrified vehicle, comprising:
a motor configured to rotate a drive wheel of the electrified vehicle;
a sensor configured to detect a motor rotation number that is the number of rotations of the motor; and
a control device configured to perform feedback control of the motor rotation number based on a value detected by the sensor, wherein the control device is configured to perform during the feedback control:
a process of extracting a vibration component in a predetermined frequency band from the value detected by the sensor, a process of calculating an integrated value by integrating the extracted vibration component for a predetermined period, and a process of determining whether the calculated integrated value falls within a predetermined abnormal range;

wherein the control device is configured to reduce slip of the drive wheel by performing the feedback control when the slip of the drive wheel is detected;

wherein the control device is configured to adjust the extracted vibration component with a predetermined gain when calculating the integrated value;

wherein the drive wheel includes a left drive wheel and a right drive wheel;

wherein the control device is configured to change a gain according to a difference between the number of rotations of the left drive wheel and the number of rotations of the right drive wheel; and wherein the control device is configured to set the gain to zero when the difference is higher than a predetermined threshold value.

2. The electrified vehicle according to claim 1, wherein the predetermined frequency band includes a resonance frequency of a drive system including the motor and the drive wheel.

3. The electrified vehicle according to claim 1, wherein the control device is configured to change the gain according to a vehicle speed of the electrified vehicle.

4. The electrified vehicle according to claim 3, wherein the control device is configured to reduce the gain continuously or stepwise as the vehicle speed increases.

5. The electrified vehicle according to claim 3, wherein the control device is configured to set the gain to zero when the vehicle speed is higher than a predetermined threshold speed.

6. The electrified vehicle according to claim 1, wherein the control device is configured to increase a desired value of the motor rotation number in the feedback control when the integrated value falls within the abnormal range.

7. The electrified vehicle according to claim 1, wherein the control device is configured to change a feedback gain in the feedback control when the integrated value falls within the abnormal range.

8. The electrified vehicle according to claim 1, wherein the control device is configured to set a feedback gain in the feedback control to zero when the integrated value falls within the abnormal range.

9. The electrified vehicle according to claim 1, wherein the control device is configured to stop the feedback control when the integrated value falls within the abnormal range.

* * * * *